United States Patent
Bojas

[11] 3,783,611
[45] Jan. 8, 1974

[54] HYDROSTATIC TRANSMISSION CONTROL SYSTEM
[75] Inventor: Edward J. Bojas, Marshall, Mich.
[73] Assignee: Eaton Corporation, Cleveland, Ohio
[22] Filed: Mar. 22, 1972
[21] Appl. No.: 237,086

[52] U.S. Cl............ 60/19, 60/444, 60/445, 60/449, 60/465
[51] Int. Cl............................................. F16h 39/46
[58] Field of Search.............. 60/19, 431, 443, 60/444, 445, 448, 449, 465

[56] References Cited
UNITED STATES PATENTS

| | | | |
|---|---|---|---|
| 3,085,391 | 4/1963 | Hatfield et al. | 60/449 X |
| 3,139,723 | 7/1964 | Hollowell | 60/433 |
| 3,214,911 | 11/1965 | Kempson | 60/431 |
| 3,371,479 | 3/1968 | Yapp et al. | 60/431 |
| 3,528,243 | 9/1970 | Cryder et al. | 60/444 X |
| 3,540,220 | 11/1970 | Lauck | 60/19 |
| 3,572,213 | 3/1971 | Lauck | 60/444 X |

Primary Examiner—Edgar W. Geoghegan
Attorney—Joseph R. Teagno et al.

[57] ABSTRACT

An improved control system for a hydrostatic transmission includes an anti-stall system for preventing overloading of an engine which drives the hydrostatic transmission. The anti-stall system senses the speed at which the engine is operating, the input to output speed ratio of the transmission as indicated by the displacement of one unit of the hydrostatic transmission, and the setting of a throttle for the engine. The anti-stall system utilizes these three inputs to regulate the pressure of control fluid conducted to a speed control valve. The speed control valve is selectively operable to vary the pressure of control fluid conducted to a pressure responsive control motor which adjusts the displacement of a unit of the hydrostatic transmission. The anti-stall system varies the pressure of the control fluid conducted to the speed control valve with variations in the fluid pressure conducted to the control motor from the speed control valve. However in the event of an impending stalling of the engine, the anti-stall system reduces fluid pressure conducted to the speed control valve. The speed control valve opens in response to this decrease in pressure to quickly decrease the fluid pressure to which the control motor is exposed. This effects operation of the control motor to decrease the output speed of the hydrostatic transmission and thereby reduce the load on the engine.

29 Claims, 4 Drawing Figures

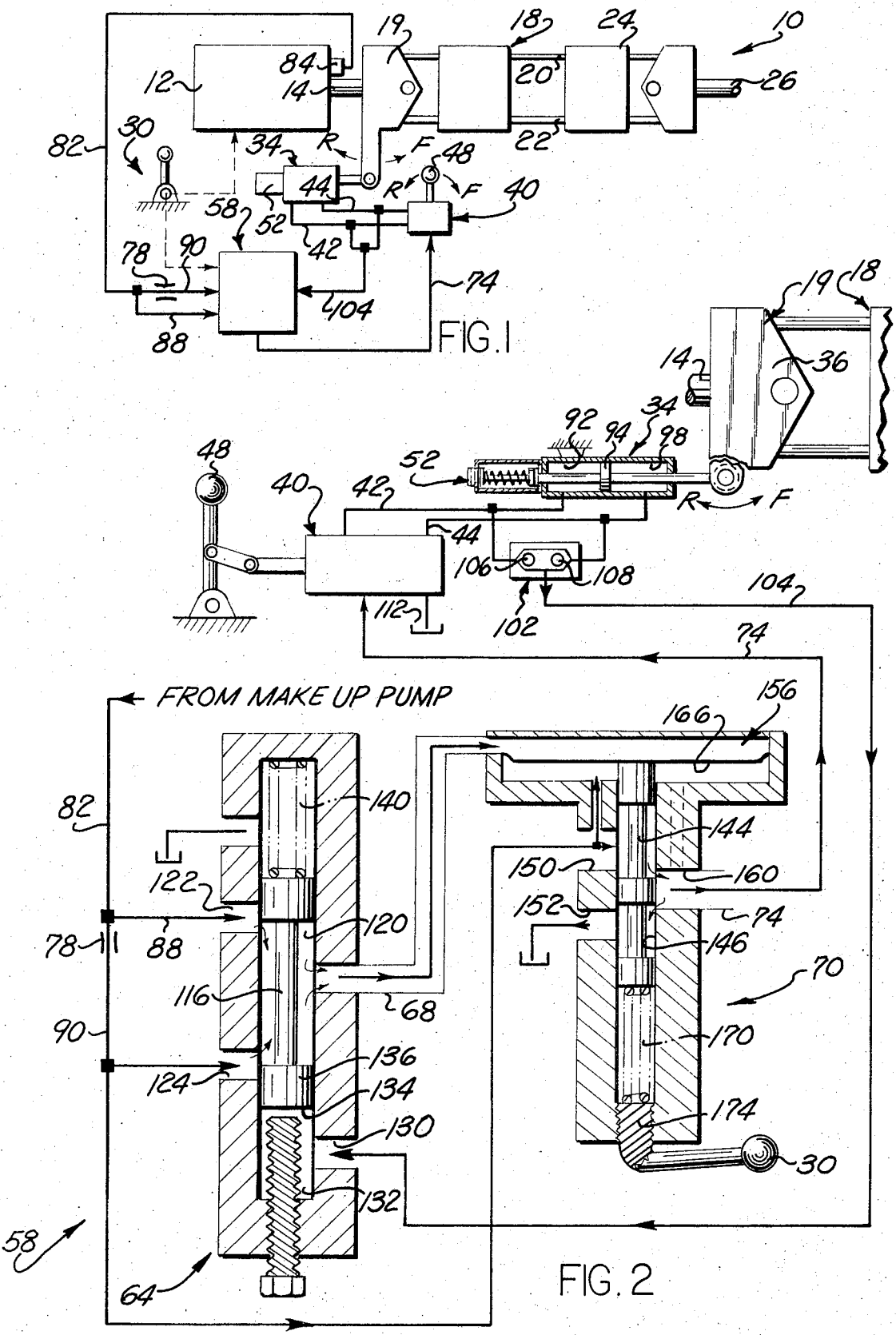

HYDROSTATIC TRANSMISSION CONTROL SYSTEM

BACKGROUND OF THE INVENTION

The present invention relates generally to an apparatus for controlling the operation of a hydrostatic transmission and more specifically to an apparatus for preventing overloading of a prime mover by the hydrostatic transmission.

Anti-stall systems have been utilized with hydrostatic transmissions to prevent an overloading of an associated prime mover or engine. Two known anti-stall systems are disclosed in U.S. Pat. Nos. 3,533,230 and 3,139,723. Both of these known anti-stall systems sense the output speed of an engine which drives the associated hydrostatic transmission and the throttle setting for the engine. Upon the occurrence of an impending overloading or stalling of the engine, these known anti-stall systems effect a reduction in the effective displacement of the hydrostatic transmission to reduce the transmission output speed and the load on the engine.

SUMMARY OF THE PRESENT INVENTION

The present invention provides an anti-stall system for use in association with a pressure regulator valve which supplies fluid to a pressure responsive control motor to vary the input to output speed ratio of a hydrostatic transmission. The anti-stall system senses the operating speed of an engine which drives the transmission, the setting of a throttle or accelerator for the engine, and the displacement of a variable displacement unit of the hydrostatic transmission. During normal operation of the engine and hydrostatic transmission, that is when an impending stall condition is not present, the anti-stall system maintains the pressure of control fluid supplied to the pressure regulator valve at a pressure which is just slightly greater than the fluid pressure supplied from the valve to the control motor. When an impending stall condition is present, the anti-stall system reduces the fluid pressure conducted to the pressure regulator valve. The pressure regulator valve opens in response to this reduction in pressure to reduce the fluid pressure conducted to the control motor. Since during normal operating condition, the anti-stall system maintains the pressure of a control fluid conducted to the pressure regulator valve at a pressure which is just slightly greater than the fluid pressure supplied to the control motor, the output speed of a hydrostatic transmission can be immediately reduced at any speed ratio by merely effecting a relatively small reduction in the pressure of control fluid supplied to the pressure regulator valve.

Accordingly, it is an object of this invention to provide a new and improved anti-stall system which is dependable and operates to quickly reduce the output speed of a hydrostatic transmission under many different operating conditions in response to an impending overloading of an engine which drives the hydrostatic transmission.

Another object of this invention is to provide a new and improved apparatus for controlling the operation of a hydrostatic transmission which is driven by an engine having a selectively settable throttle and wherein the apparatus includes an anti-stall system which senses the operating speed and throttle setting of the engine and the displacement of a variable displacement unit of the hydrostatic transmission.

Another object of this invention is to provide a new and improved control apparatus which includes a selectively operable pressure regulator valve for varying the pressure of fluid supplied to a control motor to adjust the input to output speed ratio of a hydrostatic transmission and an anti-stall system which reduces the pressure of the control fluid supplied to the pressure regulator valve and to the control motor to reduce the output speed of the hydrostatic transmission in response to the occurrence of an impending overloading of the engine and wherein the anti-stall system varies the pressure of the fluid supplied to the pressure regulator valve as a function of variations in the pressure of the control fluid supplied to the control motor in the absence of an impending overloading of the engine to enable the anti-stall system to respond quickly to the occurrence of an impending overloading of the engine.

Another object of this invention is to provide a new and improved apparatus for controlling the operation of a hydrostatic transmission driven by prime mover and having a variable displacement hydrostatic unit, and wherein the apparatus includes a valve which is operable between a closed condition and an open condition to regulate a flow of control fluid to a motor for varying the displacement of the hydrostatic unit, a means for operating the valve from the closed condition to the open condition in which the valve ports control fluid to the motor in response to a reduction in the pressure of the control fluid conducted to the valve, and an anti-stall system for reducing the pressure of the control fluid conducted to the valve to effect operation of the valve to the open condition and a porting of the reduced pressure control fluid to the motor in response to the occurrence of an impending overloading of the prime mover.

Another object of this invention is to provide a new and improved apparatus for controlling the operation of a hydrostatic transmission driven by a prime mover and having a variable displacement hydrostatic unit, and wherein the apparatus includes a fluid motor for varying the displacement of the hydrostatic unit in response to variations in control pressure to which the motor is exposed, a pressure controller which is operable to any one of a plurality of settings to vary the control pressure to which the motor is exposed with variations in the setting of the pressure controller, and an anti-stall system connected in continuous fluid communication with the motor through the pressure controller and which is operable to decrease the pressure to which the motor is exposed in response to the occurrence of an impending overloading of the prime mover.

DESCRIPTION OF THE DRAWINGS

The above objects and features of the invention will become more apparent upon a consideration of the following description taken in connection with the accompanying drawings wherein:

FIG. 1 is a schematic illustration depicting the relationship between an engine, a hydrostatic transmission, and an anti-stall system constructed in accordance with the present invention for preventing an overloading of the engine;

FIG. 2 is an enlarged schematic illustration of the anti-stall system;

DESCRIPTION OF THE PREFERRED EMBODIMENT

Figure 3:
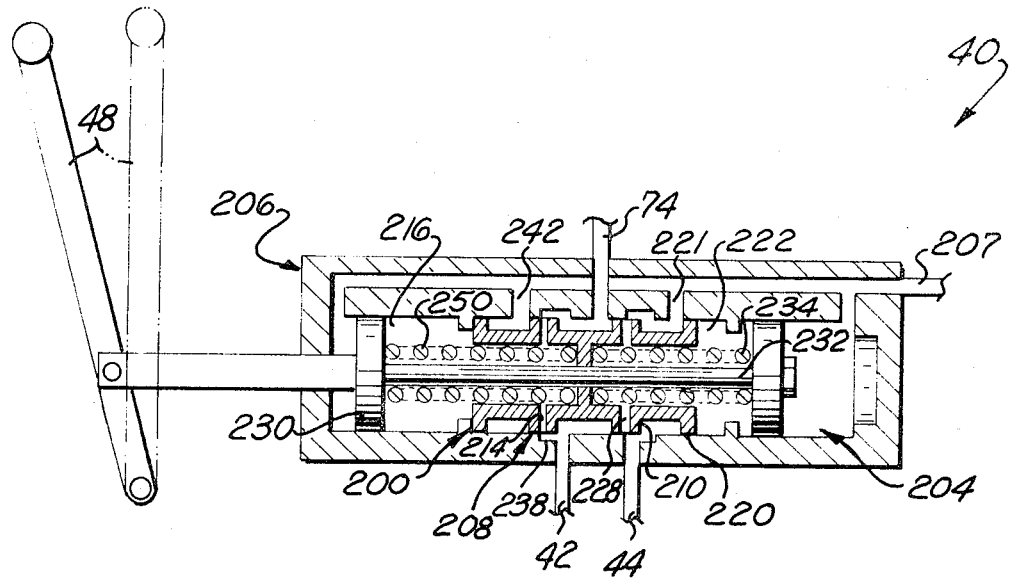
FIG. 3 is a sectional view of a speed control valve which is utilized in association with the anti-stall system, the valve being shown in an open condition.

A known hydrostatic transmission 10 is illustrated schematically in FIG. 1 in association with a prime mover or engine 12. Under normal operating conditions, an output shaft 14 from the engine 12 drives a pump unit 18 of the hydrostatic transmission. Depending upon the position of a swashplate 19 of the pump unit 18, high pressure fluid is conducted from the pump unit through either a conduit 20 or 22 to effect operation of a motor unit 24 to rotate an output shaft 26. The operating speed of the engine 12 and rotational speed of the engine output shaft 14 is controlled by a known throttle arrangement indicated schematically at 30 in FIG. 1.

It is possible to vary the speed and direction of rotation of the output shaft 26 by activating a piston and cylinder type control motor 34 to change the annular position of the swashplate 19. When the control motor 34 is extended to pivot the swashplate 19 in a counterclockwise direction (as viewed in FIG. 1) the rotational speed of the output shaft 26 is increased in a forward direction. Similarly, when the swashplate 19 is pivoted in a clockwise direction from the illustrated neutral position by retracting the control motor 34, the rotational speed of the output shaft 26 is increased in the reverse direction.

Figure 4:
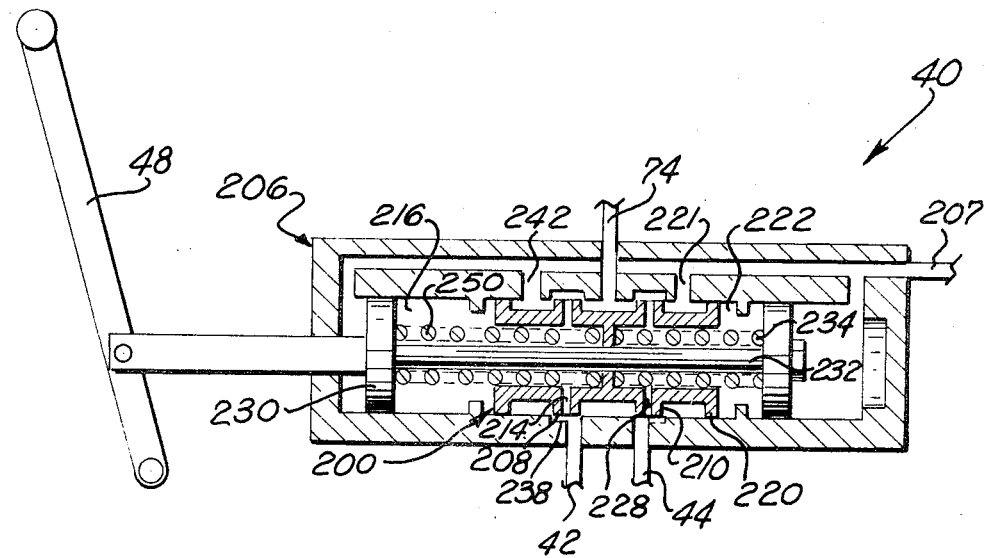
FIG. 4 is a sectional view (similar to FIG. 3) of the speed control valve in a closed condition.

The control motor 34 is activated by a speed control valve 40 which is connected with the motor by hydraulic lines or conduits 42 and 44. Movement of a control handle 48 in a forward or clockwise direction as viewed in FIG. 1 operates the valve 40 to port high pressure control fluid through the conduit 42 to the motor 34. Similarly, when the control handle 48 is moved in the reverse direction (counterclockwise as viewed in FIG. 1) high pressure fluid is ported through the conduit 44 to the motor 34. The control valve 40 is advantageously of the pressure regulator type which varies the pressure of the control fluid conducted through the lines 42 and 44 as a direct function of the extent of movement of the control handle 48. The control motor 34 includes a spring box 52 which resists operation of the control motor with a force which increases as the control motor is operated from the illustrated neutral position. Although the speed control valve 40 and control motor 34 could be constructed in a manner similar to that disclosed in either U.S. Pat. No. 3,543,515 or U.S. Pat. No. 2,396,448, in accordance with one of the features of the present invention, the speed control valve is constructed as shown in FIGS. 3 and 4 to provide a particularly advantageous relationship between the anti-stall system 58, speed control valve, and control motor.

An anti-stall system 58 constructed in accordance with the present invention is associated with the hydrostatic transmission 10 and engine 12 to prevent a stalling or overloading of the engine by the hydrostatic transmission. To accomplish this, the anti-stall system 58 effects operation of the control motor 34 to reduce the speed of the output shaft 26 of the hydrostatic transmission when an impending stall or overload condition is present. To enable the anti-stall system 58 to detect the presence of an impending stall condition, the anti-stall system senses the operating speed of the engine 12, the setting of the throttle or accelerator 30, and the input to output speed ratio of the hydrostatic transmission 10. When the combination of these factors indicates that an impending stall condition is present, the anti-stall system 58 reduces the fluid pressure conducted from the pressure regulator or speed control valve 40 to the control motor 34 to enable the spring box 52 to return the control motor toward the illustrated neutral position. As the control motor 34 returns to its neutral position, the displacement of the pump unit 18 is decreased with a resulting decrease in the rotational speed of the output shaft 26 relative to the input shaft 14 to increase the input to output speed ratio. Of course reducing the rotational speed of the output shaft 26 decreases the load on the engine 12 to prevent a stalling of the engine.

The anti-stall system 58 includes a first valve assembly 64 (see FIG. 2) which varies the pressure in an output conduit 68 as a function of variation in the operating speed of the engine 12 and the input to output speed ratio of the hydrostatic transmission 10. A second valve assembly 70 varies the pressure in an output conduit 74 leading to the pressure regulator valve 40 as a function of variations in the output pressure from the valve assembly 64 and the setting of the engine throttle 30. Therefore, the pressure of control fluid supplied to the pressure regulator valve 40 through the conduit 74 varies as a function of three factors, that is the operating speed of the engine 12, the input to output speed ratio of the hydrostatic transmission 10, and the setting of the throttle 30.

Variations in the operating speed of the engine 12 are sensed by detecting variations in a pressure differential across an orifice 78. The upstream side of the orifice 78 is connected by a line or conduit 82 with a pump 84 (FIG. 1) which is driven by the engine 12 at a speed which varies with variations in the operating speed of the engine. Under normal low speed operating conditions, the output from the pump 84 is sufficient to cause a pressure drop across the orifice 78. Therefore there is a relatively high pressure in line 88 leading from the upstream side of the orifice 78 to the first valve assembly 64 (FIG. 2) and a relatively low pressure in a line or conduit 90 leading from a downstream side of the orifice to the first and second valve assemblies 64 and 70. The pressure differential across the orifice 78 and between the two lines 88 and 90 varies in a known manner, with variations in the output speed of the engine 12.

Variations in the input to output speed ratio of the hydrostatic transmission 10, i.e., the ratio of the speed of the shaft 14 to the speed of the shaft 26, are sensed by detecting variations in the pressure of the control fluid conducted from the pressure regulator valve 40 to the motor 34. Due to the influence of the spring box 52, an increase or decrease in the pressure of control fluid ported from the pressure regulator valve 40 is necessary to operate the motor 34. Thus to increase the forward output speed of the hydrostatic transmission 10, the control handle 48 is moved to increase the pressure of control fluid conducted through the line 42 to a chamber 92 of the piston and cylinder type motor 34. Increasing the pressure in the chamber 92 moves a piston 94 toward the right (as viewed in FIG. 2) against the influence of the spring box 52 to move the swashplate 19 and increase the effective displacement of the pump unit 18 and the speed of the output shaft 26 in the forward direction relative to the input shaft 14.

If the control handle 48 is subsequently moved to operate the valve 40 to reduce the fluid pressure in the line 42, the pressure in the chamber 92 is decreased and the spring box 52 moves the piston 94 back toward the illustrated neutral position of FIG. 2. This decreases the effective displacement of the pump 18 and the output speed of the hydrostatic transmission 10. Thus, when the hydrostatic transmission 10 is being operated in a forward direction, the fluid pressure in the line 42 and cylinder chamber 92 is controlled by the pressure regulator valve 40 and varies directly with variations in the displacement of the pump 18 and the speed of the output shaft 26 relative to the input shaft 14. The pressure regulator valve 40 also controls the fluid pressure in the line 44 and cylinder chamber 98 to vary the output speed of the hydrostatic transmission 10 in the reverse direction. When the hydrostatic transmission 10 is being operated in the reverse direction, the fluid pressure in the line 44 and cylinder chamber 98 vary directly with variations in the displacement of the pump 18 and the output speed of the hydrostatic transmission 10.

The anti-stall system 58 prevents an overloading or stalling of the engine 12 during either forward or reverse operation. To enable the anti-stall system 58 to detect changes in the input to output speed ratio during either forward or reverse operation, a rectifying valve arrangement 102 (FIG. 2) is provided for enabling the relatively high pressure in the conduit 42 to be transmitted to the anti-stall system through a conduit 104 during forward operation of the hydrostatic transmission 10 and to enable a relatively high fluid pressure in the conduit 44 to be transmitted to the anti-stall system 58 during reverse operation of the hydrostatic transmission 10. The rectifying valve arrangement 102 includes a pair of check valves 106 and 108. During forward operation of the hydrostatic transmission 10 there is a relatively high fluid pressure in the conduit 42 while the conduit 44 is connected with a drain 112 by the pressure regulator valve 40. Therefore, the high pressure in the line 42 is conducted through the check valve 106 to the line 104 and biases the check valve 108 to its closed position. Similarly, during reverse operation of the hydrostatic transmission 10, a relatively high pressure is present in the conduit 44 and the conduit 42 is connected with the drain 112 by the pressure regulator valve 40. Therefore, the check valve 108 is open and the check valve 106 is biased closed to enable the high pressure in the conduit 44 to be conducted through the conduit 104 to the anti-stall system 58.

The pressure in the output conduit 68 from the first valve assembly 64 varies as a direct function of variations in the output speed of the engine 12 and the output speed of the hydrostatic transmission 10. Accordingly, the first valve assembly 64 has a valve spool 116 which is moved to vary the pressure in a mixing chamber 120 as a function of variations in the output speed of the engine 12 and the speed of the hydrostatic transmission output shaft 26. When the valve spool 116 is in the centered position shown in FIG. 2, the pressure in the mixing chamber 120 varies directly with variations in the operating speed of the engine 12. The relatively high pressure fluid from the upstream side of the orifice 78 enters the mixing chamber 120 through an inlet 122 while relatively low pressure fluid from the downstream side of the orifice 78 enters the mixing chamber 120 through an inlet 124. When the operating speed of the engine 12 increases, the pressure differential across the orifice 78 increases with a resulting increase in the pressure of the control fluid supplied through the inlet 122 to the mixing chamber 120. Similarly, a decrease in the operating speed of the engine 12 results in a decrease in the pressure differential across the orifice 78 with a resulting decrease in the fluid pressure in the mixing chamber 120.

The valve spool 116 is movable to vary the pressure in the mixing chamber 120 as a function of variations in the input to output speed ratio of the hydrostatic transmission 10. When the speed of the input shaft 14 is maintained constant, the pressure in the line 104 increases with increasing speed of the output shaft 26 and decreases with decreasing speed of the output shaft. Thus, the pressure in the line 104 varies as an inverse function of variations in the input to output speed ratio.

The pressure in the line 104 is conducted through an inlet 130 to a pressure chamber 132. An end surface 134 on a land 136 of the valve spool 116 is exposed to the fluid pressure in the chamber 132. Therefore, when the fluid pressure in the conduit 104 increases, the pressure in the chamber 132 is increased to move the valve spool 116 against the influence of a biasing spring 140. This movement of the valve spool 116 increases the exposure of the mixing chamber 120 to the high pressure conduit 88 and decreases the exposure of the mixing chamber 120 to the low pressure conduit 90 to thereby effect an increase in the fluid pressure in the mixing chamber when the pressure in the conduit 104 is increased with an increase in the output speed of the hydrostatic transmission 10.

The second valve assembly 70 modifies the control fluid pressure supplied to the pressure regulator valve 40 as a function of the output from the first valve assembly 64 and as a function of the setting of the throttle 30. The second valve assembly 70 includes a valve spool 144 which is disposed in a chamber 146 connected in fluid communication with the low pressure line 90 through an inlet port 150. The valve chamber 146 is connected with drain through an outlet port 152.

A diaphragm type motor 156 moves the valve spool 144 as a function of variations in the pressure in the conduit 68. Movement of the valve spool 144 by the motor 156 varies the extent to which the valve chamber 146 is connected with the fluid supply line 90 through the inlet 150 and with drain through the outlet 152. The motor 156 includes a diaphragm 166 which is connected to one end of the valve spool 144. The upper side of the diaphragm 166 is exposed to the fluid pressure in the outlet conduit 68 from the mixing chamber 120 of the first valve assembly 64. The lower side of the diaphragm 166 is exposed to the relatively constant fluid pressure in the supply line 90.

An increase in the fluid pressure in the mixing chamber 120 of the first valve assembly 64 results in the valve spool 144 of the second valve assembly 70 being moved downwardly (as viewed in FIG. 2) by the motor 156. This movement increases the extent to which the outlet conduit 74 and pressure regulator valve 40 are connected with the fluid supply line 90 and decreases the extent to which they are connected to drain through the opening 152. This results in an increase in the pressure of the control fluid supplied though the conduit 74 to the pressure regulator valve 40. Similarly, a decrease in the pressure conducted to the fluid motor 156 through the conduit 68 results in upward movement of the valve spool 144 to decrease the pressure of the control fluid supplied through the conduit 74 to the pressure regulator valve 40.

In addition to varying the pressure of the control fluid supplied to the pressure regulator valve 40 as a function of variations in the output from the first valve assembly 64, the second valve assembly 70 varies the pressure of the control fluid as a function of the setting of the throttle 30. When the throttle 30 is set for a relatively high speed, the fluid pressure in the mixing chamber 120 of the first valve assembly 64 increases due to an increase in the pressure from the engine driven pump 84. Similarly, when the throttle 30 is set for relatively low speed operation of the engine 12, the fluid pressure in the mixing chamber 120 of the first valve assembly 64 will decrease as the output pressure from the engine driven pump 84 decreases. Therefore, when the throttle 30 is set for high speed operation of the engine 12, a relatively large force is applied by a spring 170 against one end of the valve spool 144 to at least partially offset the increasing pressure applied to the diaphragm 166 at the opposite end of the valve spool 144. Similarly, when the throttle 30 is set for relatively low speed operation of the engine 12, the spring 170 applies a reduced force against the end of the valve spool 144.

To provide for variation in the force applied by the spring 170 against the valve spool 144, movement of the throttle 30 moves a threaded member 174 axially along a passage 146 to vary the extent to which the spring 170 is compressed against the valve spool 144. Thus, when the throttle 30 is set for relatively high speed operation of the engine 12, the threaded member 174 is turned into the passage 146 to increase the pressure applied by the spring 170 against the valve spool 144. Of course, when the throttle 30 is moved to set the engine for relatively low speed operation the threaded member 174 is moved outwardly to decrease the extent to which the spring 170 is compressed against the valve member 144. Thus, the second valve assembly 70 is operable to vary the output from the first valve assembly 64 as a function of changes in the setting of the throttle 30.

When the hydrostatic transmission 10 is being driven in a forward direction by the engine 12 under normal operating conditions, the first and second valve assemblies 64 and 70 maintain the pressure in the supply line 74 to the pressure regulator valve 40 at a level which is just slightly greater than the level of the pressure in the line 42 leading from the valve 40 to the control motor 34. WHen an impending stall condition is encountered, the pressure in the line 74 to the pressure regulator valve 40 is reduced to effect a reduction in the fluid pressure in the line 42 to the control motor 34. Of course, reducing the fluid pressure in the conduit 42 enables the spring box 52 to operate the motor 34 to move the swashplate 19 of the pump unit 18 toward the neutral condition to reduce the output speed of the hydrostatic transmission 10. Reducing the output speed of the hydrostatic transmission 10 reduces the load on the engine 12 to prevent a stalling of the engine. Of course, during reverse operation of the hydrostatic transmission 10 the fluid pressure in the conduit 44 is reduced during an impending stall condition to reduce the speed of operation of the hydrostatic transmission in the reverse direction.

To enable the anti-stall system 58 to quickly effect a reduction in the output speed of a hydrostatic transmission in the event of an impending stalling of the engine 12, the valve assemblies 64 and 70 maintain the pressure of the control fluid supplied to the pressure regulator valve 40 through the conduit 74 at a level which is just slightly greater than the fluid pressure in the conduit 42 or 44. Thus, when the motor 34 is operated to a relatively small extent from the illustrated neutral position against the influence of a spring box 52, the pressure in the supply conduit 74 for the pressure regulator valve 40 is relatively low and is only slightly greater than the fluid pressure in the conduit 42. Similarly, when the pressure regulator valve 40 is operated in an extent sufficient to effect operation of the control motor in a forward direction to a relatively large extent, the pressure in the supply conduit 74 is relatively large and is still only slightly greater than the relatively large pressure which will be present in the conduit 42 extending between the pressure regulator valve 40 and control motor 34. Of course, during operation of the hydrostatic transmission 10 in the reverse direction, the pressure in the supply conduit 74 varies with and is slightly greater than the pressure conducted to the control motor 34 from the pressure regulator valve 40 through the conduit 44.

The foregoing relationship between the pressure in the supply conduit 74 and the pressure ported from the valve 40 to the control motor 34 is maintained in the absence of an impending stall regardless of the position to which the engine throttle lever 30 is set. This is because the second valve assembly 70 compensates for changes in operating speed due to variations in throttle setting.

The pressure regulator or speed control valve 40 is operated from a closed condition to an open condition in response to a reduction in the fluid pressure in the conduit 74 by the anti-stall system 58. Operation of the speed control valve 40 to the open condition exposes the control motor 34 to the reduced pressure in the conduit 74 to enable the spring box 52 to effect a reduction in the displacement of the pump 18 and a reduction in the load on the engine 12. The valve 40 includes a valve spool 200 (see FIGS. 3 and 4) which is slidably disposed in a generally cylindrical valve chamber 204 in a housing 206. The valve chamber 204 is connected in continuous fluid communication with the anti-stall system 58 by the conduit 74 and with the motor 34 by the conduits 42 and 44 in the manner illustrated schematically in FIGs. 1 and 2. The valve chamber 204 is also connected with the drain 112 by conduit 207.

Movement of the control handle 48 from the neutral position (illustrated in dashed lines in FIG. 3) to a forward actuated position (illustrated in solid lines in FIG. 3) moves the valve spool 200 from a centered or closed position within the housing 206 toward the left to the actuated or open position illustrated in FIG. 3. This movement of the valve spool 200 ports control fluid from the conduit 74 to the conduit 42 and motor 34. Thus, high pressure fluid from the anti-stall system 58 enters the valve chamber 204 and passes through an annular passage between two circular lands 208 and 210 on the open valve spool 200 to the conduit 42. This high pressure fluid also flows through a radially extending passage 214 formed at the land 208 to a pressure chamber 216.

While high pressure fluid is being directed from the supply line 74 through the conduit 42 to one end of the fluid motor 34, the opposite end of the fluid motor is connected with the drain 112. Thus, the conduit 44 is connected through an annular passage between lands 210 and 220 on the valve spool 200 with an entrance 221 to the drain passage 207. It should be noted that a pressure chamber 222 is connected with drain by a radially extending passage 228 extending through the circular land 210.

As the motor 34 is operated against the influence of the spring box 52, the pressure in the conduit 42 increases. This increase in fluid pressure is transmitted through the passage 104 to the anti-stall system 58 which, in the absence of an impending stalling of the engine 12, increases the fluid pressure in the conduit 74 to maintain the fluid pressure in the conduit 74 slightly above the fluid pressure conducted from the speed control valve 40 to the control motor 34. The increase in fluid pressure in the conduit 42 is transmitted through the passage 214 to the pressure chamber 216 which is located between a piston element 230 and the valve spool 200. As the pressure in the chamber increases, the valve spool 220 slides axially along the support rod 232 from the open position of FIG. 3 toward the closed position of FIG. 4 against the influence of a biasing spring 234.

When the valve spool 200 reaches the closed position shown in FIG. 4, the land 208 is midway of an annular recess 238 in the housing 206. The passage 42 is then connected through the recess 238 in fluid communication with both the supply conduit 74 and with an entrance 242 to the drain passage 207. The land 208 on the closed valve spool 200 substantially blocks fluid flow to and from the conduit 42 by providing a modulating action between the conduit 42, control fluid supply conduit 74 and the drain conduit 207. This modulating action maintains the fluid motor 34 in an operated position which corresponds to the extent which the handle 48 is moved from the neutral position. However, when the valve spool 200 is in the closed position, the conduit 42 and motor 34 are connected in fluid communication with both the drain 112 and the control fluid supply conduit 74 to facilitate rapid response of the motor 34 to operation of either the anti-stall system 58 or control valve 40.

Movement of the control handle 48 from the neutral position shown in dashed lines in FIG. 3 results in operation of control motor 34 to an extent which is proportional to the distance which the handle is moved. This is because the fluid pressure in the conduit 42 effects movement of the piston 94 against the spring box 52 and of the valve spool 200 against the biasing spring 234. The further the handle 48 is moved in a forward direction from the neutral position, the greater is the extent to which the spring 234 is compressed and the greater is the fluid pressure which must be built-up in the pressure chamber 216 to move the valve spool 200 from the open position to the closed position. Of course, the fluid pressure in the chamber 216 is directly proportional to the fluid pressure in the conduit 42. Therefore, the greater the fluid pressure in the chamber 216, the greater the pressure in the chamber 92 of the motor 34 and the distance through which the piston 94 is moved against the influence of the spring box 52. The general relationship between the extent to which the handle 48 is moved and the extent to which the control motor 34 is operated is substantially the same as is disclosed in U.S. Pat. No. 3,540,220 which is included herein by this reference thereto.

When the valve spool 200 is in the closed position of FIG. 4 and the fluid pressure conducted through the conduit 74 is decreased due to operation of the anti-stall system 58, this decrease in fluid pressure is immediately communicated around the land 208 to the motor 34 through conduit 42 and to the pressure chamber 216 through th passage 214. The decrease in the fluid pressure in the chamber 216 enables the spring 234 to move the valve spool 200 toward the left from the closed position shown in FIG. 4 toward the position shown in FIG. 3. This movement of the valve spool 200 increases the communication of the conduit 44 with drain and of the conduit 42 with the fluid pressure supply line 74. Since the fluid pressure in the supply line 74 has been reduced by operation of the anti-stall system 58, the spring box 52 returns the motor 34 toward its neutral position, shown in FIG. 2. The valve spool remains in open position until the fluid pressure in the supply conduit 74 increases sufficiently to again move the valve spool against the influence of the biasing spring 234 to the position shown in FIG. 4. Of course at this time the fluid pressure in the conduit 42 is sufficient to operate the motor 34 against the influence of the spring box 52 to a position corresponding to the extent of actuation of the control handle 48.

When the control handle 48 is operated in the reverse direction, the valve spool is moved toward the right hand (as viewed in FIG. 3) to connect the conduit 44 with the supply line 74 and to connect the conduit 42 with drain 112 through the passage 207. As the pressure in the fluid conduit 44 builds up, it is transmitted through the radial passage 228 to the pressure chamber 222 to move the valve spool to the centered modulating position of FIG. 4 against the influence of a biasing spring 250. Of course, upon the occurrence of an impending stall the biasing spring 250 moves the valve spool 200 back toward the right to connect the conduit 44 to the reduced pressure in the supply conduit 74. Although the specific valve 40 shown in FIGS. 3 and 4 is preferred, it should be understood that other known valve constructions could be utilized with an anti-stall system 58 constructed in accordance with the present invention.

From the foregoing description it is apparent that the anti-stall system 58 includes a first valve assembly 64 which cooperates with the orifice 78 and control motor 34 to detect variations in the operating speed of the engine 12 and the input to output speed ratio of the hydrostatic transmission 10. The output pressure from the first valve assembly 64 varies as a function of these two variables. This output pressure is related to throttle settings by the second valve assembly 70 which provides a source of control fluid for the valve 40. Therefore, the pressure of the control fluid supplied to the valve 40 varies as a function of variations in engine operating speed, input to output speed ratio of the hydrostatic transmission 10, and setting of the throttle 30.

To enable the anti-stall system 58 to respond quickly to an impending overloading of the engine 12, the two valve assemblies 64 and 70 maintain the pressure of the control fluid supplied to the valve 40 through the conduit 74 at a level which is slightly greater than the pressure in the higher pressure one of the two conduits 42 and 44. Thus, during forward operation and in the absence of an impending stall, the pressure of the control fluid in the conduit 74 increases and decreases as the fluid pressure in the conduit 42 increases and decreases. Although the fluid pressure in the conduit 74 varies with variations in the fluid pressure in the conduit 42 during forward operation, the fluid pressure in the conduit 74 is maintained at a level which is slightly greater than the fluid pressure in the conduit 42 until an impending stall condition is encountered.

When an impending stall condition is encountered, the operating speed of the engine 12 and pump 84 decrease with a resulting decrease in the fluid pressure at the inlet 122 to the mixing chamber 120. This results in a decrease in the pressure communicated through conduit 68 to the diaphragm motor 156 and upward movement of the valve spool 144. As the valve spool 144 moves upwardly, the fluid pressure in the conduit 74 decreases. This decrease in fluid pressure is communicated through the valve 40 and one of the conduits 42 and 44 to the motor 34. The spring box 52 then operates the motor 34 to decrease the speed of the output shaft 26 to reduce the load on the engine 12.

Having described a specific preferred embodiment of the invention, the following is claimed:

1. Apparatus for controlling the operation of a hydrostatic transmission having a variable displacement hydrostatic unit connected with a prime mover having a selectively settable throttle, said apparatus comprising motor means for varying the displacement of the hydrostatic unit to vary the output speed of the hydrostatic transmission, means for providing a first signal which varies with variations in the operating speed of the prime mover, means for providing a second signal which varies with variations in the setting of the throttle, means for providing a third signal which varies as a function of variations in the displacement of the hydrostatic unit, and anti-stall means responsive to said first, second and third signals for effecting operation of said motor means to vary the displacement of the hydrostatic unit to reduce the output speed of the hydrostatic transmission upon the occurrence of an impending overloading of the prime mover.

2. An apparatus as set forth in claim 1 further including control means for porting fluid to said motor means at a pressure corresponding to a desired displacement of the hydrostatic unit in the absence of an impending overloading of the prime mover, said anti-stall means including means for porting fluid to said control means at a pressure which is greater than and which varies as a function of variations in the pressure of the fluid ported from said control means to said motor means.

3. An apparatus as set forth in claim said anti-stall wherein saidanti-stall means includes means for reducing the fluid pressures ported to said control means and to said motor means in response to the occurrence of an impending overloading of the prime mover.

4. An apparatus as set forth in claim 2 wherein said means for providing a third signal includes means for sensing the fluid pressure ported from said control means to said motor means.

5. An apparatus as set forth in claim 1 wherein said anti-stall means includes valve means for porting fluid at a pressure which varies as a function of said first, second and third signals, said means for providing a first signal including means for conducting to said valve means fluid at a pressure which varies as a function of variations in the operating speed of the prime mover, said means for providing a second signal including means for applying to said valve means a pressure which varies with variations in the throttle setting, said means for providing a third signal includes means for conducting to said valve means fluid at a pressure which varies as a function of variations in the displacement of the hydrostatic unit.

6. Apparatus as set forth in claim 1 further including control valve means operable between a closed condition and an open condition connecting said motor means in fluid communication with said anti-stall means, said valve means including means for operating said valve means from the closed condition to the open condition in response to operation of said anti-stall means upon the occurrence of an impending overloading of the prime mover.

7. An apparatus as set forth in claim 1 further including speed control valve means operable from a closed condition to an open condition to port fluid under pressure to said motor means to effect operation of said motor means and a variation in the displacement of the hydrostatic unit, and manually actuatable means for effecting operation of said speed control valve means between the open and closed conditions to effect a desired variation in the displacement of the hydrostatic unit, said speed control valve means including means for effecting operation of said speed control valve means from the closed condition to the open condition in response to operation of said anti-stall means upon the occurrence of an impending overloading of the prime mover.

8. Apparatus for controlling the operation of a hydrostatic transmission driven by a prime mover, said apparatus comprising motor means for varying the input to output speed ratio of the hydrostatic transmission in response to variations in pressure of a control fluid supplied to said motor means, control means for varying the pressure of the control fluid supplied to said motor means, means for conducting fluid to said control means from a source of control fluid, and anti-stall means for reducing the pressure of control fluid conducted to said control means and to said motor means to effect operation of said motor means to reduce the output speed of the hydrostatic transmission in response to the occurrence of an impending overloading of the prime mover and for maintaining the pressure of the control fluid supplied to said control means at a pressure which is greater than the pressure of the control fluid supplied to said motor means and varying the pressure of the control fluid supplied to said control means as a function of variations in the pressure of the control fluid supplied to said motor means in the absence of an impending overloading of the prime mover.

9. An apparatus as set forth in claim 8 wherein said anti-stall means includes means for increasing the pressure of the control fluid supplied to said control means in response to a sensing of an increase in the pressure of the control fluid supplied to said motor means in the absence of an impending overloading of the prime mover.

10. An apparatus as set forth in claim 8 further including means for varying the pressure of the control fluid supplied to said control means as a function of variations in the output speed of the prime mover.

11. An apparatus as set forth in claim 8 wherein said anti-stall means includes first conduit means for conducting fluid at a first pressure, second conduit means for conducting fluid at a second pressure, means for varying at least one of said first and second pressures as a function of variations in the operating speed of the prime mover, means defining a mixing chamber connected in fluid communication with said first and second conduit means, valve means for varying the rate of flow of fluid from said first and second conduit means into said mixing chamber to vary the fluid pressure in said mixing chamber, actuator means for effecting operation of said valve means as a function of variations in the pressure of the control fluid supplied to said motor means, and means for supplying control fluid to said means for conducting control fluid to said control means at a third pressure which varies as a function of variations in the fluid pressure in said mixing chamber.

12. An apparatus as set forth in claim 11 wherein said means for supplying control fluid at a third pressure includes pressure regulator means connected in fluid communication with said means for conducting control fluid to said control means and with said mixing chamber for varying said third pressure as a function of variations in the fluid pressure in said mixing chamber and as a function of variations in the setting of a throttle for the prime mover, said pressure regulator means including a valve member, means for applying to said valve member a force which varies as a function of variations in the fluid pressure in said mixing chamber, and means for applying to said valve member a force which varies as a function of variations in the setting of the throttle for the prime mover.

13. An apparatus as set forth in claim 8 wherein said motor means is operable in a first direction from an initial position to effect operation of the hydrostatic transmission in a forward direction and is operable in a second direction from the initial position to effect operation of the hydrostatic transmission in a reverse direction, said apparatus further including first conduit means for conducting control fluid from said control means to said motor means to effect operation of said motor means in the first direction, second conduit means for conducting control fluid from said control means to said motor means to effect operation of said motor means in the second direction, and valve means for enabling the fluid pressure in said first conduit means to be transmitted to said anti-stall means during operation of said motor means in the first direction and for enabling the fluid pressure in said second conduit means to be transmitted to said anti-stall means during operation of said motor means in the second direction.

14. An apparatus as set forth in claim 13 wherein said anti-stall means includes means for increasing the pressure of control fluid conducted to said control means in response to an increase in the fluid pressure transmitted to said anti-stall means by way of said valve means during operation of said motor means in one of said first and second directions and for decreasing the pressure of control fluid conducted to said control means in response to a decrease in the fluid pressure transmitted to said anti-stall means by way of said valve means during operation of said motor means in one of said first and second directions.

15. An apparatus as set forth in claim 8 wherein said control means includes a valve member movable between a closed position and an open position in which control fluid can flow between the source of control fluid and said motor means, and means for moving said valve member from the closed position to the open position in response to a reduction in the pressure of control fluid conducted to said control means.

16. An apparatus as set forth in claim 8 wherein said control means includes a valve member movable between a closed position and an open position in which said motor means is connected in fluid communication with drain and means for moving said valve member from the closed position to the open position in response to a reduction in pressure of the control fluid conducted to said control means.

17. Apparatus comprising a variable diplacement fluid pump, fluid motor means for varying the displacement of said pump, control valve means for directing fluid pressure to said fluid motor means and for effecting operation of said fluid motor means by varying the fluid pressure directed to said fluid motor means, means for directing fluid pressure to said valve means, and anti-stall means for varying the fluid pressure directed to said valve means with variations in the fluid pressure directed to said fluid motor means to maintain the fluid pressure directed to said valve means slightly above the pressure directed to said fluid motor means for all displacements of said pump in the absence of an impending stall condition, said anti-stall means including means for sensing an impending stall condition and for lowering the pressure directed to said valve means in response to the sensing of an impending stall condition to immediately effect operation of said motor means to reduce the displacement of said pump.

18. Apparatus as set forth in claim 17 wherein said anti-stall means includes means for sensing variations in the fluid pressure directed to said motor means and pressure regulator means for increasing the pressure of the fluid directed to said valve means in response to an increase in the fluid pressure directed to said motor means and for decreasing the pressure of the fluid directed to said valve means in response to a decrease in the fluid pressure directed to said motor means.

19. Apparatus as set forth in claim 17 wherein said valve means includes means for varying the pressure of the fluid directed to said fluid motor means in response to variations in the fluid pressure directed to said valve means.

20. Apparatus as set forth in claim 17 wherein said valve means includes a valve spool and means for moving said valve spool from a closed position at least partially blocking fluid flow to said fluid motor means to an open position in response to a lowering of the fluid pressure directed to said valve means.

21. Apparatus for controlling the operation of a hydrostatic transmission driven by a prime mover and having a variable displacement hydrostatic unit, said apparatus comprising motor means for varying the displacement of the hydrostatic unit in response to variations in the pressure of control fluid supplied to said motor means, valve means operable between a closed condition and an open condition to regulate a flow of control fluid to said motor means, means for conducting control fluid to said valve means from a source of control fluid, means for operating said valve means from the closed condition to the open condition in which said valve means ports the control fluid to said motor means in response to a reduction in the pressure of the control fluid conducted to said valve means, and anti-stall means for reducing the pressure of the control fluid conducted to said valve means to effect operation of said valve means to the open condition and a porting of relatively low pressure control fluid to said motor means in response to the occurrence of an impending overloading of the prime mover.

22. An apparatus as set forth in claim 21 further including manually actuatable means movable from an initial position to any one of a plurality of actuated positions spaced different distances from said initial position, means for operating said valve means from the closed condition to the open condition in response to movement of said manually actuatable means from the initial position to any one of said actuated positions to port control fluid to said motor means, and means for operating said valve means from the open condition to the closed condition in response to operation of said motor means to an extent which is a function of the extent of movement of said manually actuatable means from the initial position in the absence of an impending overloading of the prime mover.

23. An apparatus as set forth in claim 22 wherein said means for operating said valve means from the open condition to the closed condition in response to operation of said motor means includes pressure responsive means for operating said valve means to the closed condition in response to an increase in the pressure of the control fluid conducted to said motor means to a pressure corresponding to the extent of movement of said manually actuatable means from the initial position, said anti-stall means being effective to prevent an increase in the pressure of the control fluid conducted to said motor means to a pressure corresponding to the extent of movement of said manually actuatable means from the initial position in response to an impending overloading of the prime mover.

24. An apparatus as set forth in claim 21 wherein said anti-stall means includes means for maintaining the pressure of the control fluid conducted to said valve means at a pressure which is greater than the pressure of the control fluid supplied to said motor means and for varying the pressure of the control fluid supplied to said valve means as a function of variations in the pressure of the control fluid supplied to said motor means.

25. An apparatus for controlling the operation of a hydrostatic transmission driven by a prime mover and having a variable displacement hydrostatic unit, said apparatus comprising fluid motor means for varying the displacement of the hydrostatic unit in response to variations in control fluid pressure to which said motor means is exposed, pressure controller means operable to anyone of a plurality of settings to vary the control fluid pressure to which said motor means is exposed with variations in the setting of said pressure controller means, and anti-stall means connected in continuous fluid communication with said motor means through said pressure controller means for decreasing the pressure to which said motor means is exposed in response to the occurrence of an impending overloading of the prime mvoer.

26. An apparatus for controlling the operation of a hydrostatic transmission driven by a prime mover and having a variable displacement hydrostatic unit, said apparatus comprising fluid motor means for varying the displacement of the hydrostatic unit in response to variations in control fluid pressure to which said motor means is exposed, pressure controller means operable to anyone of a plurality of settings to vary the control fluid pressure to which said motor means is exposed with variations in the setting of said pressure controller means, and anti-stall means connected in fluid communication with said motor means through said pressure controller means for decreasing the pressure to which said motor means is exposed in response to the occurrence of an impending overloading of the prime mover, said pressure controller means including valve means operable between a first condition varying the control fluid pressure to which said motor means is exposed and a second condition in which the control fluid pressure to which said motor means is exposed is maintained substantially constant and passage means for connecting said anti-stall means in fluid communication with said motor means when said valve means is in either the first condition or the second condition.

27. An apparatus for controlling the operation of a hydrostatic transmission driven by a prime mover and having a variable displacement hydrostatic unit, said apparatus comprising fluid motor means for varying the displacement of the hydrostatic unit in response to variations in control fluid pressure to which said motor means is exposed, pressure controller means operable to anyone of a plurality of settings to vary the control fluid pressure to which said motor means is exposed with variations in the setting of said pressure controller means, anti-stall means connected in fluid communication with said motor means through said pressure controller means for decreasing the pressure to which said motor means is exposed in response to the occurrence of an impending overloading of the prime mover, means for providing a first signal which varies with variations in the operating speed of the prime mover, means for providing a second signal which varies with variations in the setting of a throttle for the prime mover, and means for providing a third signal which varies as a function of variations in the displacement of the hydrostatic unit, said anti-stall means including means responsive to said first, second and third signals for reducing the control fluid pressure to which said motor means is exposed upon the occurrence of an impending overloading of the prime mover.

28. An apparatus for controlling the operation of a hydrostatic transmission driven by a prime mover and having a variable displacement hydrostatic unit, said apparatus comprising fluid motor means for varying the displacement of the hydrostatic unit in response to variations in control fluid pressure to which said motor means is exposed, pressure controller means operable to anyone of a plurality of settings to vary the control fluid pressure to which said motor means is exposed with variations in the setting of said pressure controller means, and anti-stall means connected in fluid communication with said motor means through said pressure controller means for decreasing the pressure to which said motor means is exposed in response to the occurrence of an impending overloading of the prime mover, said anti-stall means including means for maintaining the pressure of control fluid conducted to said pressure controller slightly above the control fluid pressure to which said motor means is exposed for all displacements of said hydrostatic unit in the absence of an impending overloading of the prime mover.

29. An apparatus for controlling the operation of a hydrostatic transmission driven by a prime mover and having a variable displacement hydrostatic unit, said apparatus comprising fluid motor means for varyin varying displacement of the hydrostatic unit in response to variations in control fluid pressure to which said motor means is exposed, pressure controller means operable to any one of a plurality of settings to vary the control fluid pressure to which said motor means is exposed with variations in the setting of said pressure controller means, and anti-stall means connected in fluid communication with said motor means through said pressure controller means for decreasing the pressure to which said motor means is exposed in response to the occurrence of an impending overloading of the prime mover, said pressure controller means including valve means for varying the control fluid pressure to which said motor means is exposed, said valve means being operable between a first condition varying the control fluid pressure to which said motor means is exposed and a second condition in which the control fluid pressure to which said motor means is exposed is maintained substantially constant, said apparatus further including fluid pressure feedback means for urging operation of said valve means from the first condition to the second condition under the influence of a fluid pressure force which varies as a function of variations in the control fluid pressure to which said motor means is exposed, and means for urging said valve means against operation to the second condition which a second force with corresponds to a setting of said pressure controller means.

* * * * *